US008214689B2

(12) United States Patent
Hosaka

(10) Patent No.: US 8,214,689 B2
(45) Date of Patent: Jul. 3, 2012

(54) DISK ARRAY DEVICE AND ITS CONTROL METHOD

(75) Inventor: Fumiaki Hosaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 94 days.

(21) Appl. No.: 12/676,227

(22) PCT Filed: Feb. 19, 2010

(86) PCT No.: PCT/JP2010/001111
§ 371 (c)(1),
(2), (4) Date: Mar. 3, 2010

(87) PCT Pub. No.: WO2011/101917
PCT Pub. Date: Aug. 25, 2011

(65) Prior Publication Data
US 2011/0208998 A1    Aug. 25, 2011

(51) Int. Cl.
*G06F 11/00*    (2006.01)
(52) U.S. Cl. ............. 714/22; 714/6.2; 714/6.21; 714/14
(58) Field of Classification Search .................. 714/6.2, 714/6.21, 14, 22, 42; 702/63; 711/114, 118, 711/147; 713/300, 320, 324, 340
See application file for complete search history.

(56) References Cited

U.S. PATENT DOCUMENTS

| 5,906,658 | A  | * | 5/1999  | Raz ................................ 711/147 |
| 6,195,754 | B1 | * | 2/2001  | Jardine et al. ................. 713/324 |
| 6,937,947 | B2 | * | 8/2005  | Trembley ......................... 702/63 |
| 7,100,059 | B2 | * | 8/2006  | Sakakibara et al. .......... 713/300 |
| 2004/0054851 | A1 | | 3/2004 | Acton |
| 2005/0071697 | A1 | | 3/2005 | Batchelor |
| 2005/0240814 | A1 | * | 10/2005 | Sasakura et al. ................. 714/14 |
| 2005/0270927 | A1 | * | 12/2005 | Hayashi ........................ 369/47.1 |
| 2007/0033431 | A1 | | 2/2007 | Pecone |
| 2007/0094446 | A1 | | 4/2007 | Sone et al. |
| 2008/0005474 | A1 | * | 1/2008 | Long .............................. 711/118 |
| 2009/0077312 | A1 | | 3/2009 | Miura |
| 2010/0229018 | A1 | * | 9/2010 | Hutchison et al. ............ 713/340 |

FOREIGN PATENT DOCUMENTS

| JP | 10-320889 A  | 12/1998 |
| JP | 2007-115050 A | 5/2007 |

* cited by examiner

*Primary Examiner* — Robert Beausoliel, Jr.
*Assistant Examiner* — Joseph D Manoskey
(74) *Attorney, Agent, or Firm* — Mattingly & Malur, PC

(57) ABSTRACT

To shorten the time from power restoration to the resumption of business operation. During a power failure, a memory controller saves configuration information and directory information of a shared memory to a nonvolatile memory, and saves data of a cache memory to the nonvolatile memory. During power restoration from a power failure, the memory controller returns information of the nonvolatile memory to the shared memory so that it can be updated before the lapse of the initialization time, the micro processor executes online processing based on information of the shared memory, and the memory controller 70 controls the storage area of the cache memory so that it will become gradually writable according to the battery capacity of the battery if the battery capacity of the battery is still gradually increasing even after the lapse of the initialization time.

12 Claims, 15 Drawing Sheets

FIG.16

| | | |
|---|---|---|
| TOTAL CACHE SIZE | | xxGB |
| BATTERY CAPACITY | | xx% |
| AVAILABLE CACHE SIZE | | xxGB |
| NUMBER OF AVAILABLE ADDRESSES | | 65536 |
| LU | OPERATING RATIO | ALLOCATION |
| 0 | 30% | 19661 |
| 1 | 10% | 6554 |
| 2 | 5% | 3277 |
| 3 | 5% | 3277 |
| 4 | 0% | 0 |
| 5 | 15% | 9830 |
| 6 | 5% | 3277 |
| 7 | 10% | 6554 |
| 8 | 0% | 0 |
| 9 | 5% | 3277 |
| . | . | . |
| . | . | . |
| . | . | . |
| . | . | . |
| N | 15% | 9830 |
| TOTAL | 100% | 65536 |

DISK ARRAY DEVICE AND ITS CONTROL METHOD

TECHNICAL FIELD

The present invention relates to a disk array device and its control method for performing the processing of saving data stored in a volatile memory to a nonvolatile memory during a power failure, and returning the data stored in the nonvolatile memory to the volatile memory during the power restoration so that the business operation can be resumed.

BACKGROUND ART

A disk array device comprises a cache memory for temporarily storing data. When there is a write access from a host computer to a disk drive, the completion of write processing is notified to the host computer when the write data is written into the cache memory. When there is a read access from the host computer to the disk drive, high-speed access is realized by reading data from the cache memory if the read data is a cache hit.

However, since many of the cache memories are configured from a volatile memory, there are cases where the cache data is lost if the power supply to the cache memory is suspended due to a power source failure or the like.

In light of the above, there are disk array devices equipped with a large capacity battery. With this type of disk array device, since electric power can be supplied from the large capacity battery to the cache memory and the like, the business operation can be continued without being suspended even during a power failure as a result of feeding power from the large capacity battery to the cache memory from the time of power failure to the time of power restoration.

Nevertheless, if a large capacity battery is mounted, the disk array device will become expensive since the large battery is costly. In addition, even upon using a large capacity battery, there is a battery capacity is limited, there will be no choice but to suspend the business operation if the length of the power failure is prolonged.

Meanwhile, if a small battery of a small capacity is mounted on the disk array device in substitute for the large capacity battery, increase in costs as a result of mounting a battery can be suppressed. Here, a system may be considered of saving data stored in a volatile memory to a nonvolatile memory during a power failure, feeding power to the volatile memory from the battery during power restoration, returning the data stored in the nonvolatile memory to the volatile memory, and resuming the business operation based on the data that was returned to the volatile memory.

In the foregoing case, as described in Patent Literature 1, it is also possible to adopt a system of increasing the amount of data to be written into the memory and also increasing the amount of data to be read, and increasing the storage capacity of each recording operation of the optomagnetic disk when the remaining battery level is high, and reducing the amount of data to be read from the memory and reducing the storage capacity of each recording operation of the optomagnetic disk if the battery capacity is low. Moreover, as described in Patent Literature 2, it is also possible to adopt a system of selecting the operation mode of the storage system according to the battery capacity during a power source failure.

CITATION LIST

Patent Literature

[PTL 1]
Japanese Unexamined Patent Publication No. 10-320889
[PTL 2]
Japanese Unexamined Patent Publication No. 2007-115050

SUMMARY OF INVENTION

Technical Problem

If a disk array device equipped with a small battery is used for saving data stored in a volatile memory to a nonvolatile memory during a power failure, feeding power to the volatile memory from the battery during power restoration, returning the data stored in the nonvolatile memory to the volatile memory, and resuming the business operation based on the data that was returned to the volatile memory, even upon adopting the systems disclosed in Patent Literatures 1 and 2, there are cases where the business operation cannot be resumed immediately at the time of the power restoration.

Specifically, if a failure occurs once again; for instance, when giving consideration to a case where power failure occurs once again after the power is restored, business operation cannot be resumed based on data returned to the volatile memory until the small battery is recharged with the amount of electric power that is required for re-saving the data stored in the volatile memory to the nonvolatile memory, and the time required for resuming the business operation from the time of power restoration will become longer.

The present invention was devised in view of the problems encountered in the conventional technology. Thus, an object of this invention is to provide a disk array device and its control method capable of shortening the time from power restoration to the resumption of business operation.

Solution to Problem

In order to achieve the foregoing object, upon using a memory controller to manage a cache memory for temporarily storing data associated with the processing of a control unit, a shared memory for storing information for managing the cache memory, and a nonvolatile memory for saving data stored in the cache memory and data stored in the shared memory, during a power failure of a power source, information stored in the shared memory and data stored in the cache memory are saved to the nonvolatile memory and, during the power restoration of the power source, power is fed to the cache memory using a first battery and power is fed to the shared memory using a second memory that is charged in less time than the first battery, whereby the memory controller gradually releases the storage area of the cache memory as an accessible storage area according to the charging capacity of the first battery. The control unit is thereby able to access the shared memory and also gradually access the cache memory.

Advantageous Effects of Invention

According to the present invention, it is possible to shorten the time from power restoration to the resumption of business operation.

BRIEF DESCRIPTION OF DRAWINGS

FIG. 16 A configuration diagram of the management table.

DESCRIPTION OF EMBODIMENTS

Examples

This example explains a case where, during a power failure of a power source, information stored in the shared memory and data stored in the cache memory are saved to the nonvolatile memory and, during the power restoration of the power source, power is fed to the cache memory using a first battery and power is fed to the shared memory using a second memory that is charged in less time than the first battery, the storage area of the cache memory is gradually released as an accessible storage area according to the charging capacity of the first battery.

Figure 1:
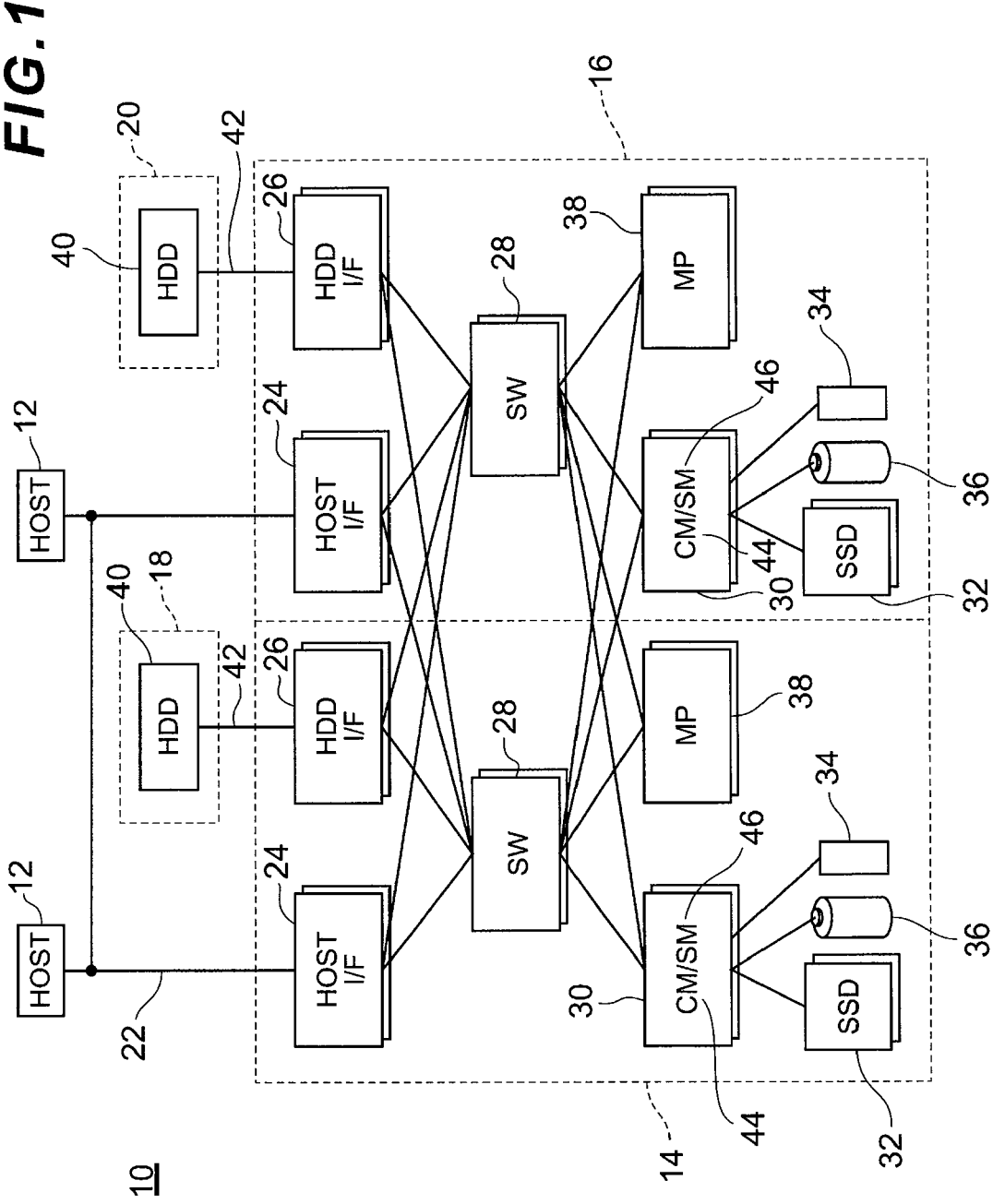
FIG. 1 A block configuration diagram of the storage system to which this invention is applied.

An embodiment of the present invention is now explained with reference to the attached drawings. FIG. 1 is a block configuration diagram of a storage system to which this invention is applied.

In FIG. 1, the storage system 10 comprises a plurality of host computers 12, disk control modules (DKC modules) 14, 16, and disk unit modules (DKU modules) 18, 20, and the respective host computers 12 and the disk control modules 14, 16 are respectively connected via a network 22. One disk array device is configured from the disk control module 14 and the disk unit module 18, one disk array device is configured from the disk control module 16 and the disk unit module 20, and the two disk array devices are respectively connected to the respective host computers 12 via the network 22.

Each host computer 12 comprises a micro processor, a memory, an I/O interface, a display device and the like (all not shown), and the micro processor issues commands based on the programs and data stored in the memory, and additionally sends and receives information to and from the storage system 10 via the network 22.

The disk control modules 14, 16 comprise a plurality of host interfaces 24, a plurality of HDD (Hard Disk Drive) interfaces 26, a plurality of switches 28, a plurality of volatile memories 30, a plurality of nonvolatile memories 32, a plurality of batteries 34, 36 with different characteristics, and a plurality of micro processors (MP: Micro Processor) 38.

Each host interface 24, each HDD interface 26, each volatile memory 30 and each micro processor 38 are mutually connected via the switch in the self-disk control module, and mutually connected via the switch 28 in another disk control module.

The disk unit modules 18, 20 respectively comprise a memory device 40 for storing data to be accessed by the respective host computers 12. Each memory device 40, as a storage device, comprises a plurality of HDDs, for example. A plurality of virtual devices are allocated as logical devices (LDEVs) to at least a partial storage area of each HDD.

Each host interface 24 is configured as a first interface unit for sending and receiving information to and from each host computer 12 via the network 22 and, for example, controls the data transfer between the respective host computers 12 and the respective volatile memories 30 upon interpreting commands from the respective host computers 12. Each HDD interface 26 is connected to each memory device 40 via each internal network 42, and is configured as a second interface unit for performing data I/O processing to each memory device 40.

Each micro processor 38 is connected to each host interface 24 and each HDD interface 26 and each volatile memory 30 via the switch 28, and configured as a control unit for controlling the data I/O processing to a plurality of virtual devices; for instance, to a plurality of logical units (LU).

Each volatile memory 30 comprises a cache memory (CM) 44 for temporarily storing data associated with the processing of the respective micro processors 38, and a shared memory (SM) 46 for storing directory information and system configuration information as management information for managing the cache memory 44. Specifically, with each volatile memory 30, a part of the storage area is used as the cache memory 44, and the remaining storage area is used as the shared memory 46.

Each nonvolatile memory 32 is configured as a nonvolatile memory; for instance, as an SSD (Solid State Drive) for saving data stored in the cache memory 44 and information stored in the shared memory (SM).

The battery 34, as a power feed source for feeding power to the shared memory 46, is configured, for example, from an electrical double layer capacitor, a hybrid capacitor, or as a redox capacitor.

The battery 36, as a power feed source for feeding power to the cache memory 44, is configured, for example, from a lithium ion secondary battery, a nickel metal hydride battery, or a lead storage battery.

The battery 34 configured from an electrical double layer capacitor receives the supply of electric power from a power source, and is characterized in that it is charged in less time than the battery 36 configured from a secondary battery (lithium ion secondary battery).

Specifically, the battery (second battery) 34 with a shorter charging time than the battery (first battery) 36 is used for feeding power to the shared memory 46, and the battery 36 having a large battery capacity and with a longer charging time than the battery 34 is used for feeding power to the cache memory 44.

Figure 2:
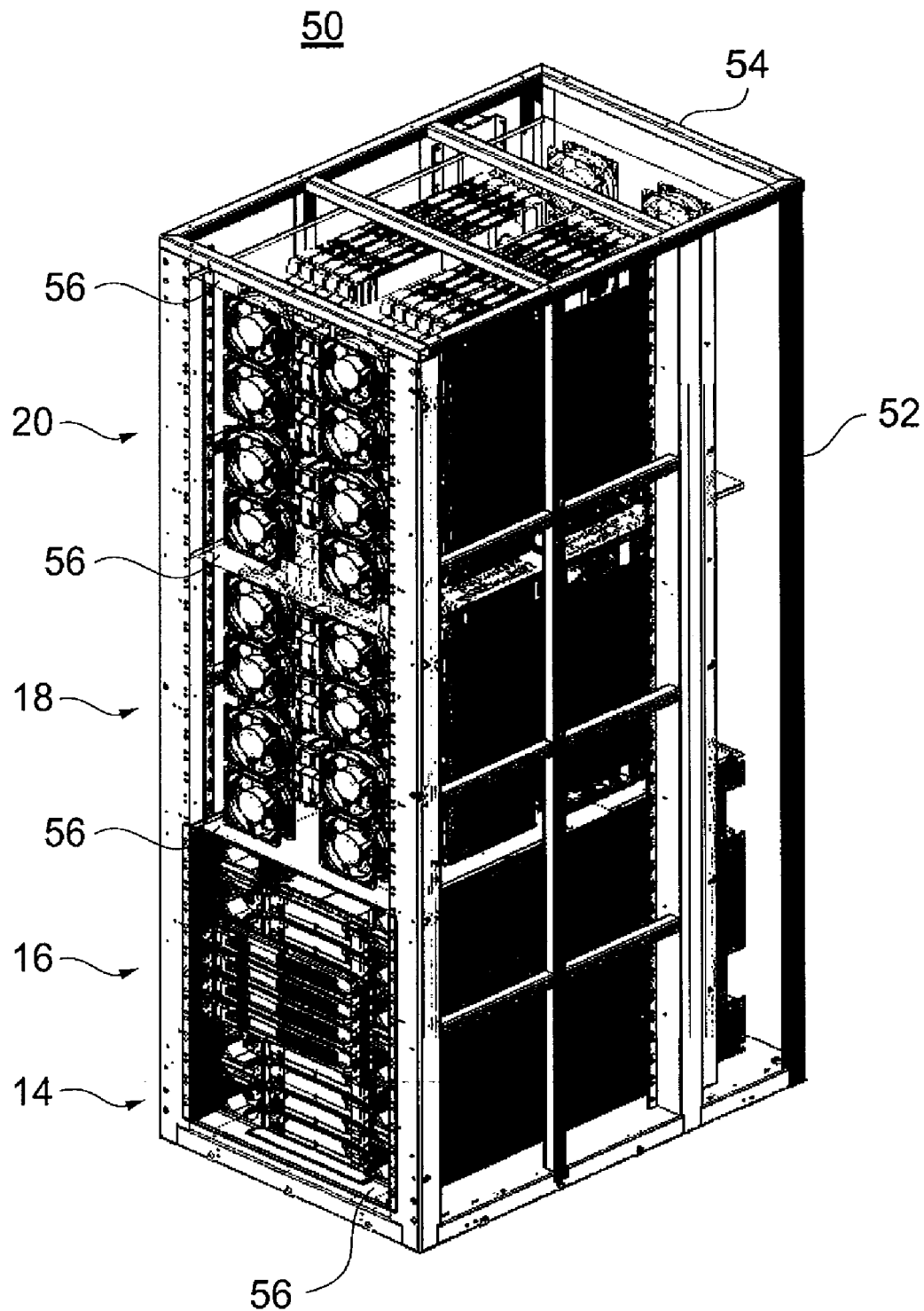
FIG. 2 A perspective view of the disk unit module and the disk control module.
Figure 3:
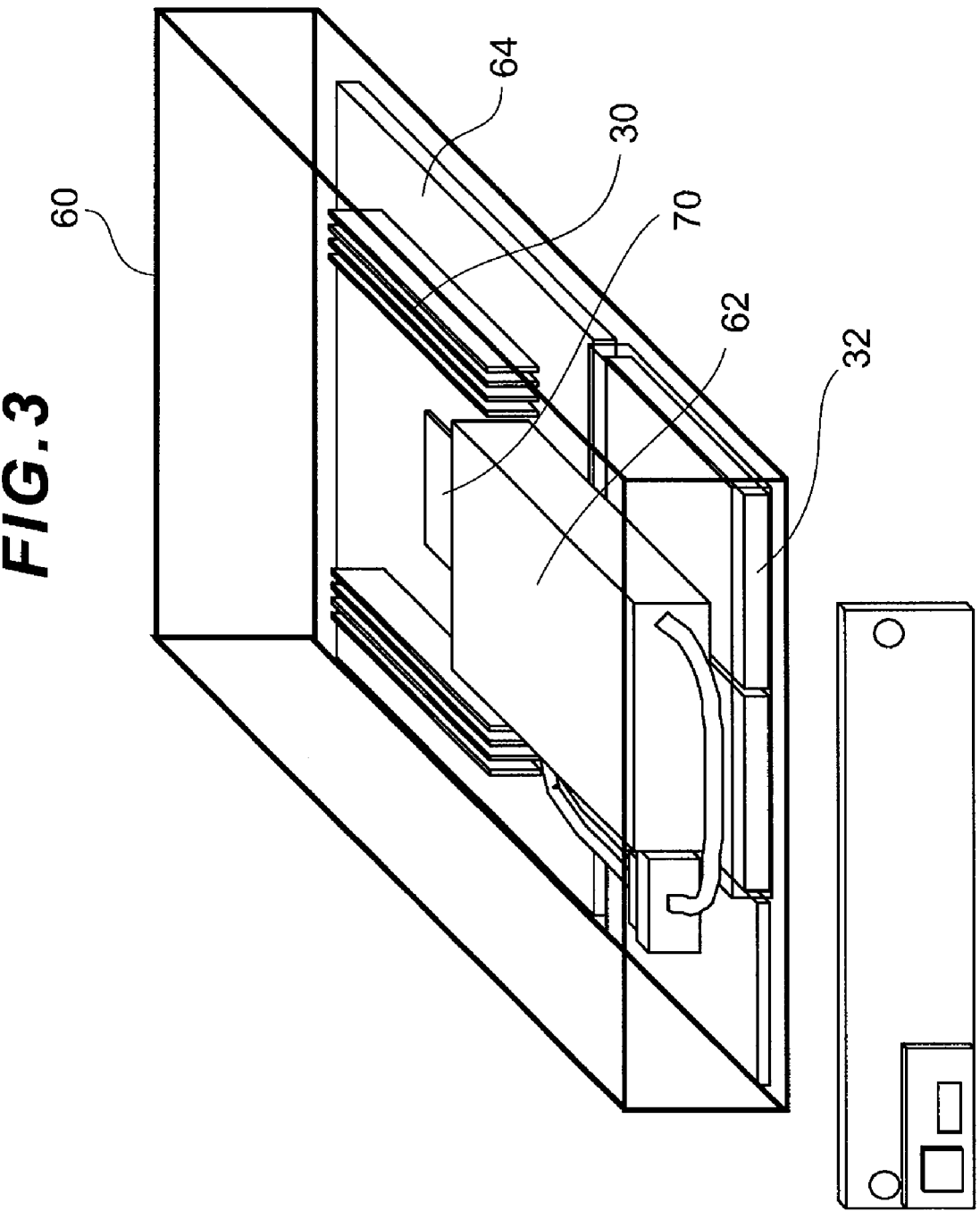
FIG. 3 An exploded perspective view of the relevant part of the disk control module.

FIG. 2 shows the structure of the disk control modules 14, 16 and the disk unit modules 18, 20, and FIG. 3 shows the structure of the disk control modules 14, 16.

In FIG. 2, the frame body of a module housing case 50 is configured from a plurality of frames 52, 54, and the module housing case 50 is divided into three blocks with a plurality of dividers 56. The upper block houses the disk unit module 20, the middle block houses the disk unit module 18, and the lower block houses the disk control modules 14, 16 in 8 rows.

In FIG. 3, a package 60 is formed in an approximate box shape, and the package 60 houses the volatile memory 30 and the nonvolatile memory 32 as elements configuring the disk control module 14 or the disk control module 16, and also houses the battery case 62. The battery case 62 houses the battery 34 and the battery 36. Moreover, the volatile memory 30 is mounted on a base 64, and a memory controller 70 described later is mounted on the base 64.

Figure 4:
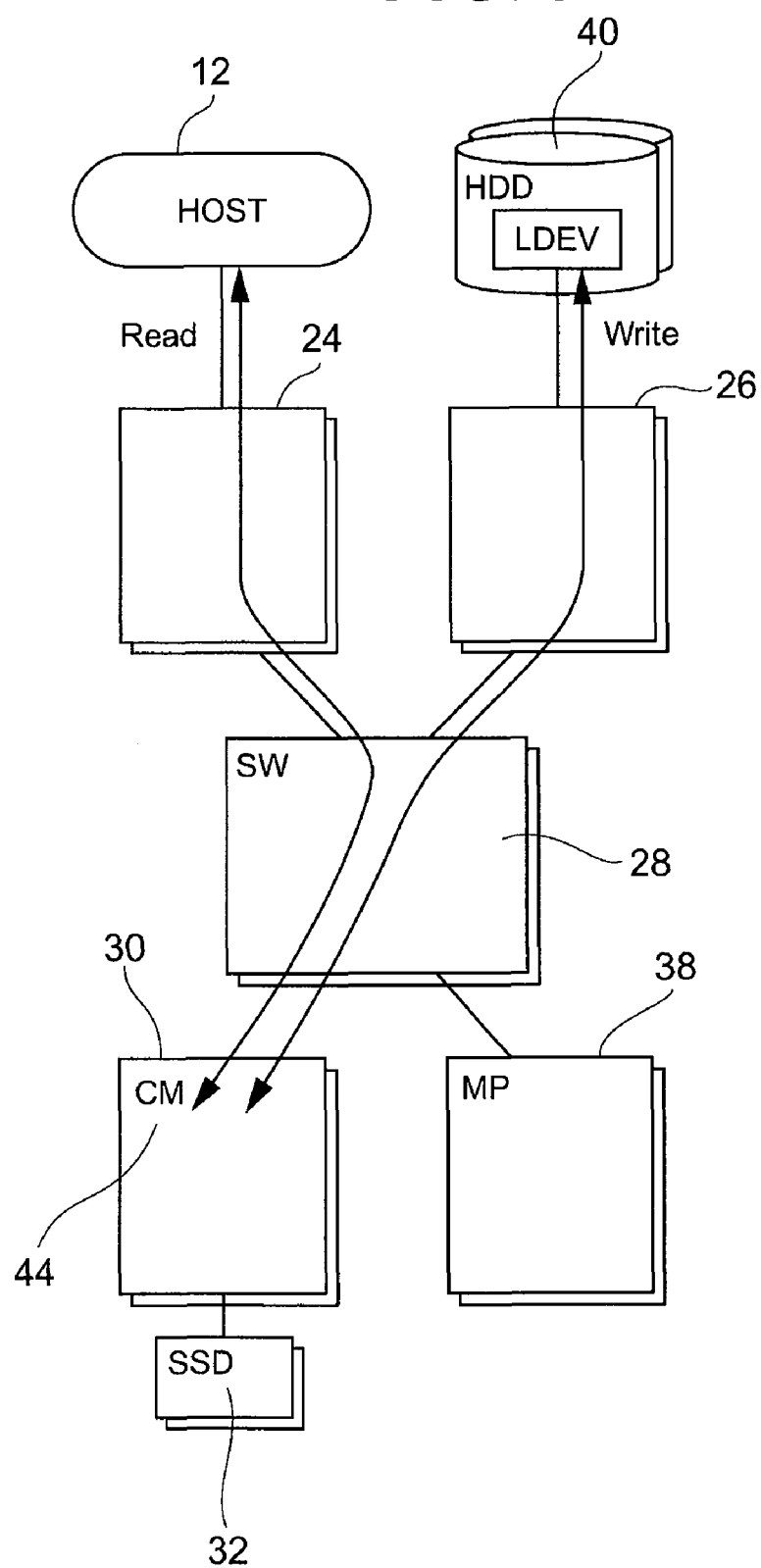
FIG. 4 A block diagram explaining the read access and write access of the storage system.

The operation of the storage system 10 is now explained with reference to the block diagram of FIG. 4. Foremost, when a command is issued from any one of the host computers 12, the host interface 24 receives the command. The host interface 24 interprets the command and, if the command is a write access request, transfers the write access request to the micro processor (MP) 38 via the switch 28. In response to the write access request, the micro processor 38 writes the write data into the cache memory 44 via the switch 28, and notifies the completion of the write access to the host computer 12 via the host interface 24 on the condition that the write data has been written into the cache memory 44.

The write data that was written into the cache memory 44 is thereafter written into the memory device 40 via the switch 28 and the HDD interface 26 based on the processing of the micro processor 38.

Subsequently, if a read access request is issued as a command from any one of the host computers 12 and the host interface 24 receives a read access request, the host interface 24 transfers the read access request to the micro processor (MP) 38 via the switch 28. In response to the read access request, the micro processor 38 searches for the data in the cache memory 44 and, if the read data exists in the cache memory 44, sends the data in the cache memory 44 as the read data to the host computer 12 via the host interface 24.

Meanwhile, if the read data does not exist in the cache memory 44, the micro processor 38 searches for the data of the memory device 44 via the HDD interface 26, and sends the data obtained from the search as the read data to the host computer 12 via the host interface 24.

Figure 5:
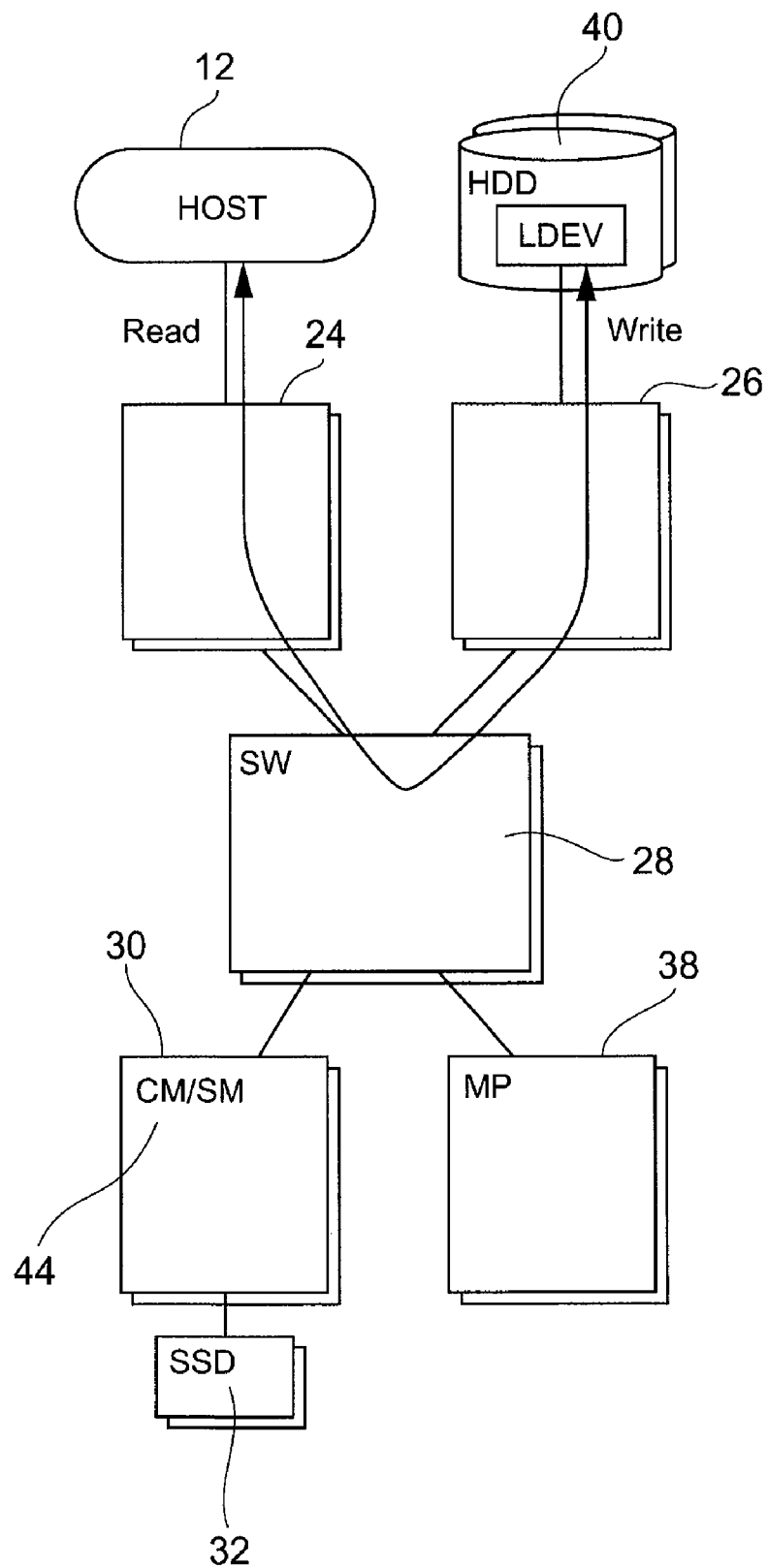
FIG. 5 A block diagram explaining the write through processing in the storage system.

The write through processing in the storage system 10 is now explained with reference to the block diagram of FIG. 5. If a write access request is issued as a command from any one of the host computers 12, in response to the write access request from the host computer 12, the micro processor 38 accesses the cache memory 44. Here, the write data is the data that exists in the cache memory 44. However, if it is data that has not yet been written into the memory device 40, the micro processor 38 performs write through processing of writing write data into the memory device 40 via the HDD interface 26 without writing the write data into the cache memory 44.

Moreover, when the micro processor 38 accesses the cache memory 44 in response to the write access request from the host computer 12, if the cache memory 44 does not have any storage area for storing the write data, the micro processor 38 performs write through processing for writing write data into the memory device 40 via the HDD interface 26.

The method of feeding power to the cache memory 44 and the shared memory 46 is now explained with reference to FIG. 6 to FIG. 8.

Figure 6:
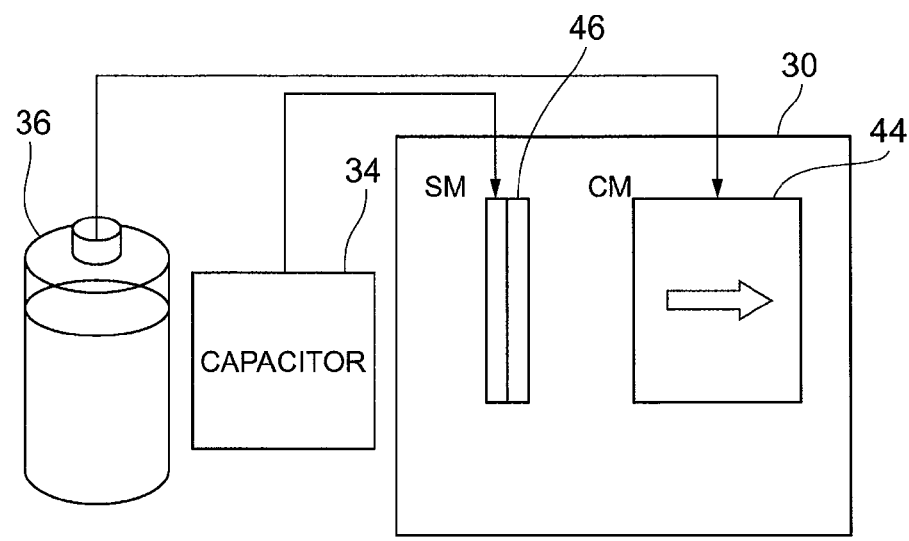
FIG. 6 A configuration diagram explaining the first power feed system for feeding power to the cache memory and the shared memory.

FIG. 6 shows an example upon adopting the first power feed system for feeding power to the cache memory 44 and the shared memory 46. In the first power feed system, power is fed from the battery 34 configured from an electrical double layer capacitor to the shared memory 46, and power is fed from the battery 36 configured from a secondary battery to the cache memory 44.

The system for feeding power to the cache memory 44 and the shared memory 46 can be separated into two systems; namely, a system for feeding power to the shared memory 46 and a system for feeding power to the cache memory 44. While the cache memory 44 can be backed up with the battery 46 with a large capacity on the one hand, if power is restored after the power source is subject to a power failure, power can be fed to the shared memory 46 from the battery 34 faster than feeding power to the shared memory 46 from the battery 36.

Specifically, as a result of using the battery 34 with a short charging time for the shared memory 46, the battery capacity can be secured before the data update at the time of power restoration, and the system configuration information and directory information can be updated promptly. Moreover, as a result of using the battery 36 with a large battery capacity for the cache memory 44, control for gradually releasing the storage area of the cache memory 44 according to the charging capacity of the battery 36 at the time of power restoration; that is, memory control for causing the storage area of the cache memory 44 to gradually become available; that is, writable is being performed.

Figure 7:
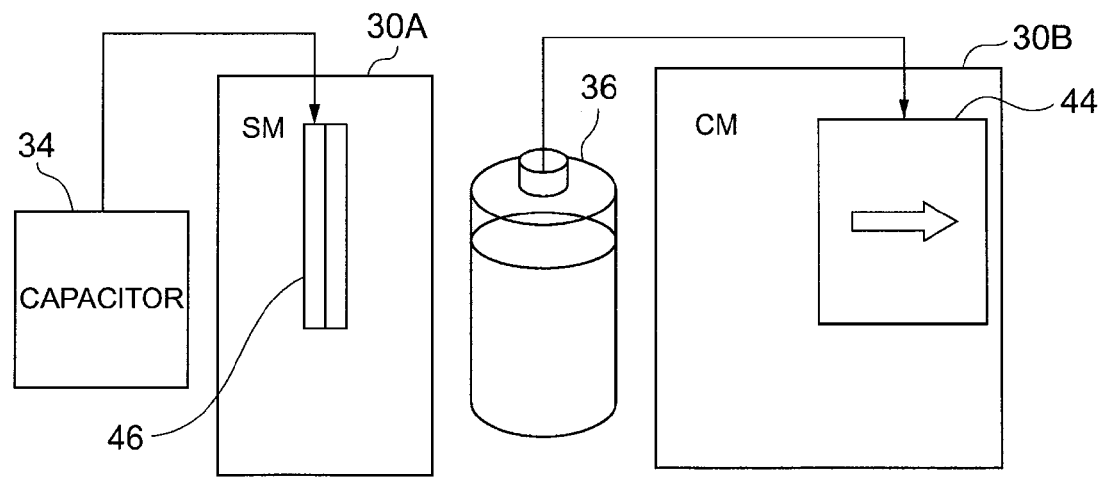
FIG. 7 A configuration diagram explaining the second power feed system for feeding power to the cache memory and the shared memory.

FIG. 7 shows an example upon adopting the second power feed system for feeding power to the cache memory 44 and the shared memory 46. With the second power feed system, the volatile memory 30 is separated into a volatile memory 30A and a volatile memory 30B, the shared memory 46 is configured from the volatile memory 30A and the cache memory 44 is configured from the volatile memory 30B, and power is fed to the shared memory 46 from the battery 34 and power is fed to the cache memory 44 from the battery 36.

Even in the second power feed system, as a result of using the battery 34 with a short charging time for the shared memory 46, the battery capacity can be secured before the data update at the time of power restoration, and the system configuration information and directory information can be updated promptly. Moreover, as a result of using the battery 36 with a large battery capacity for the cache memory 44, memory control for gradually releasing the storage area of the cache memory 44 according to the charging capacity of the battery 36 at the time of power restoration is being performed.

In the case of the second power feed system, the package that houses the volatile memory 30A and the package that houses the volatile memory 30B can be arranged separately.

Figure 8:
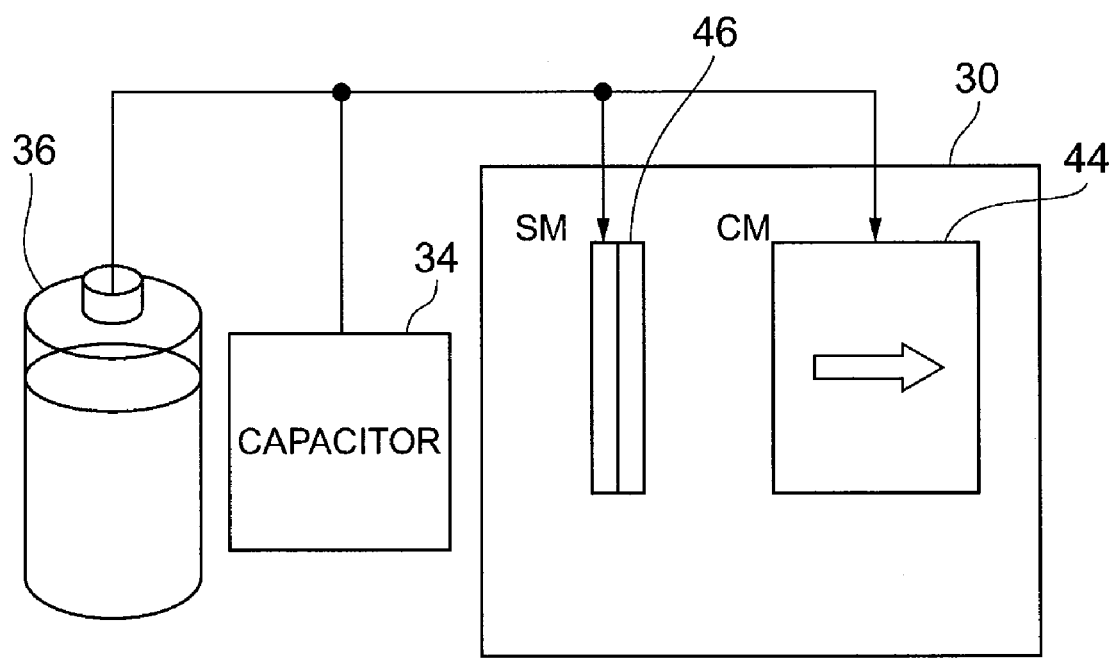
FIG. 8 A configuration diagram explaining the third power feed system for feeding power to the cache memory and the shared memory.

FIG. 8 shows an example of adopting the third power feed system for feeding power to the cache memory 44 and the shared memory 46. With the third power feed system, the battery 34 and the battery 36 are connected in parallel, and power is fed from the batteries 34, 36 to the shared memory 46 and the cache memory 44, respectively.

With the third power feed system, the battery 34 has a high output voltage than the battery 36. As a result of causing the voltage of the battery 34 to be higher than the voltage of the battery 36, the power feed from the battery 34 can be made faster than from the battery 36 upon feeding power to the shared memory 46 and the cache memory 44. Moreover, during a power failure of the power source, control can be performed for preferentially saving the data stored in the shared memory 46 to the nonvolatile memory 32.

Figure 9:
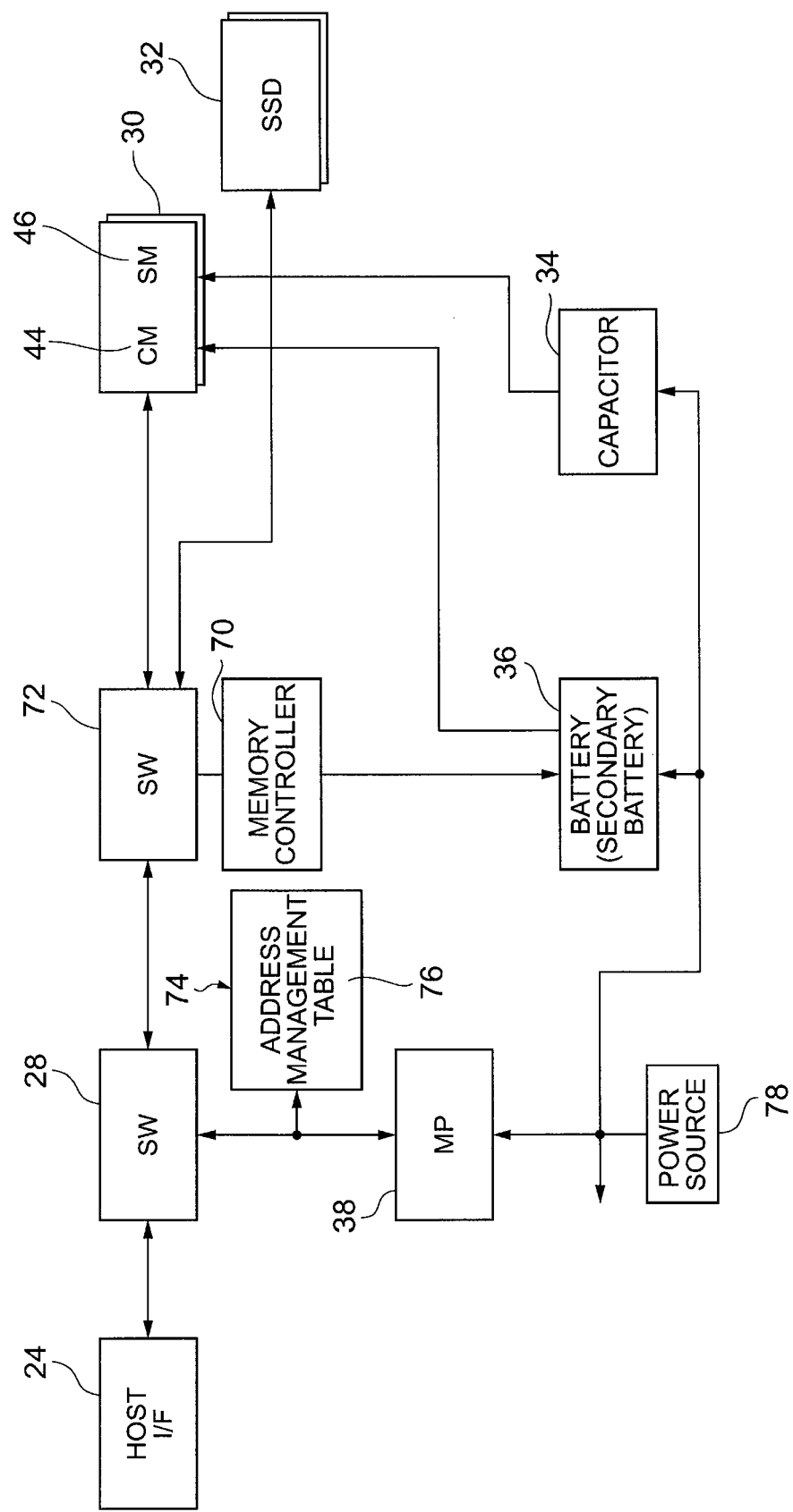
FIG. 9 A block configuration diagram explaining the processing of the memory controller.

FIG. 9 shows a block diagram of the memory control system. Upon controlling the data of the cache memory 44 and the shared memory 46 and the nonvolatile memory 32, a memory controller 70 is provided in correspondence with each micro processor 38. The memory controller 70 is connected to the cache memory 44, the shared memory 46 and the nonvolatile memory 32 via a switch 72, and also connected to the memory 74 and the micro processor 38 via the switch 72 and the switch 28. The memory 74 stores an address management table 76. The address management table 76 is configured as a table for managing the relationship between the storage area and address range of the cache memory 44.

The memory controller 70 is connected to a power source 78 for supplying electric power to the respective disk control modules 14, 16, and is started up by receiving the supply of electric power from the power source 78. The batteries 34, 36 are respectively connected to the power source 78 and, if the power source 78 is subject to a power failure, power is fed to the cache memory 44 with the electric power from the battery 36, and power is fed to the shared memory 46 with the electric power from the battery 34. Meanwhile, when the power source 78 is restored from a power failure, electric power from the power source 78 is supplied to the batteries 34, 36, respectively, so as to charge the respective batteries 34, 36.

Here, during the power failure of the power source 78, the memory controller 70 saves the data stored in the cache memory 44 to the nonvolatile memory 32 via the switch 72, and saves the system configuration information and directory information stored in the shared memory 46 to the nonvolatile memory 32 via the switch 72.

Meanwhile, when the power source 78 is restored from the power failure, the memory controller 70 performs processing for returning the data stored in the nonvolatile memory 32 to the cache memory 44 via the switch 72, and performs processing for returning the system configuration information and directory information stored in the nonvolatile memory 32 to the shared memory 46 via the switch 72.

Figure 10:
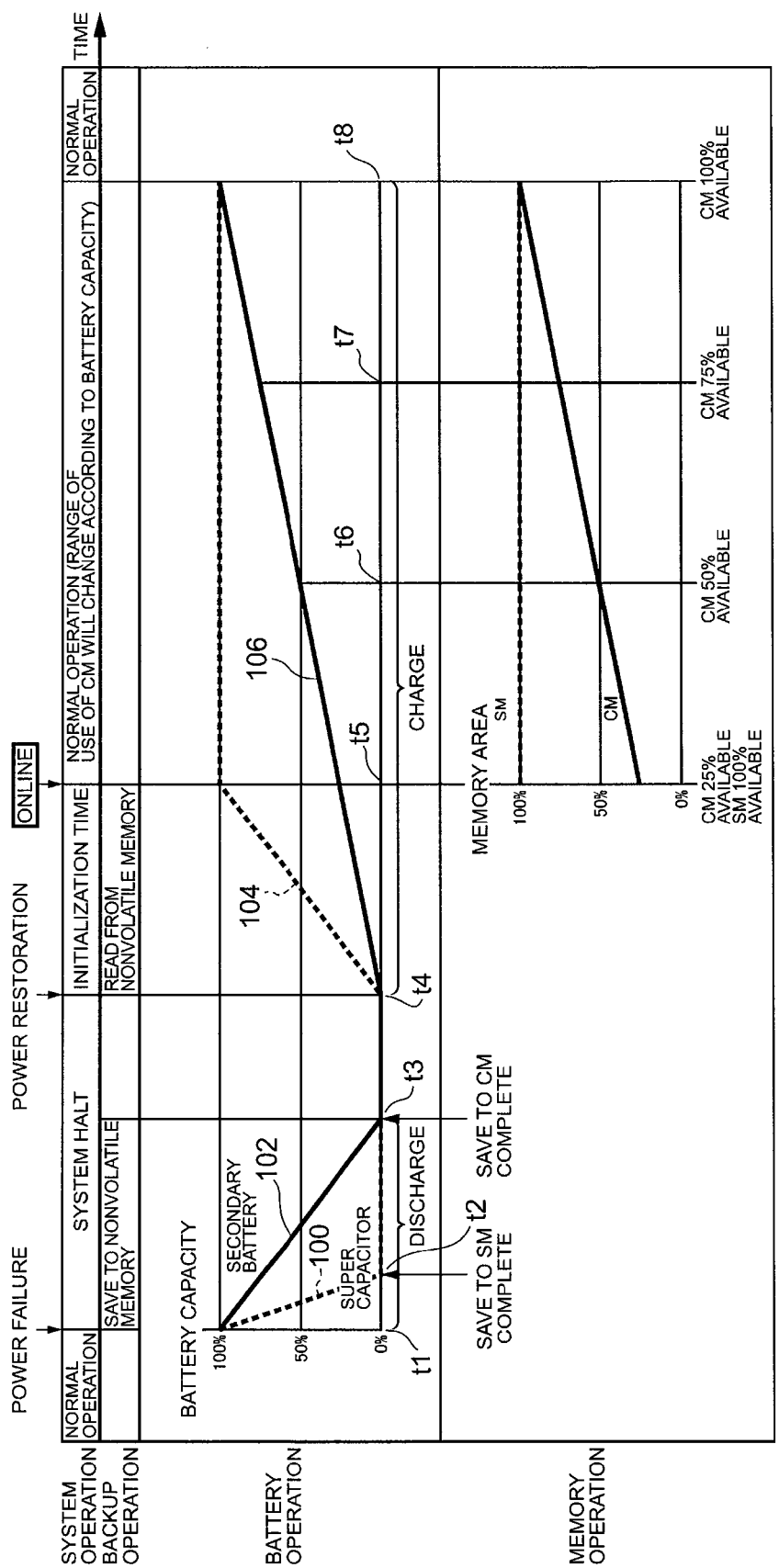
FIG. 10 A diagram explaining the system operation, backup operation, battery operation and memory operation from power failure to power restoration.

Specifically, as shown in FIG. 10, if the power source 78 is subject to a power failure at timing t1 during the execution of a normal operation, the system is halted, the battery 34 discharges according to a characteristic 100, and the battery 36 discharges according to a characteristic 102. Thus, the memory controller 70 saves the system configuration information and directory information stored in the shared memory 46 to the nonvolatile memory 32 via the switch 72 up to timing t2, and saves the data stored in the cache memory 44 to the nonvolatile memory 32 via the switch 72 up to timing t3.

After the power source 78 is subject to a power failure, if the power is restored at timing t4, the battery 34 is charged according to a characteristic 104, and the battery 36 is charged according to a characteristic 106. Specifically, the charging capacity of the battery 34 will reach its full charge status up to timing t5 which is the timing that the initialization time (time required for performing processing to initialize data and the like) of the memory controller 70 and the micro processor 38 elapses.

Thus, the memory controller 70 returns the system configuration information and directory information stored in the nonvolatile memory 32 to the shared memory 46 at timing t5 on the condition that the initialization time has elapsed, and the foregoing information can be updated promptly. Based on the information stored in the shared memory 46 from timing t5, the micro processor 38 will be able to engage in normal operation; that is, it will be able to perform online processing.

Meanwhile, since the battery 36 is charged according to the characteristic 106, the charging capacity will be 25% of the full charge status at timing t5, the charging capacity will be 50% at timing t6, the charging capacity will be 75% at timing t7, and the charging capacity will be 100% at timing t8; that is, the charging capacity will be a full charge status.

Specifically, the battery 36 will have a charging capacity of 25% of the full charge status at timing t5, and the charging capacity will not become 100% until timing t8. Thus, at timing t5, even if power is fed from the battery 36 to the cache memory (CM) 44, since the current capacity will be insufficient if the entire storage area of the cache memory (CM) 44 is to be used, only a part of the storage area of the cache memory (CM) 44 can be used.

Thus, in this example, the memory controller 70 measures the charging capacity (battery capacity) of the battery 36 as the charging status of the battery 36, and performs control for gradually releasing the storage area of the cache memory 44 according to the measurement result; that is, it performs memory control from timing t5 to timing t8 for causing the storage area of the cache memory 44 to become gradually available, accessible or writable.

Figure 11:
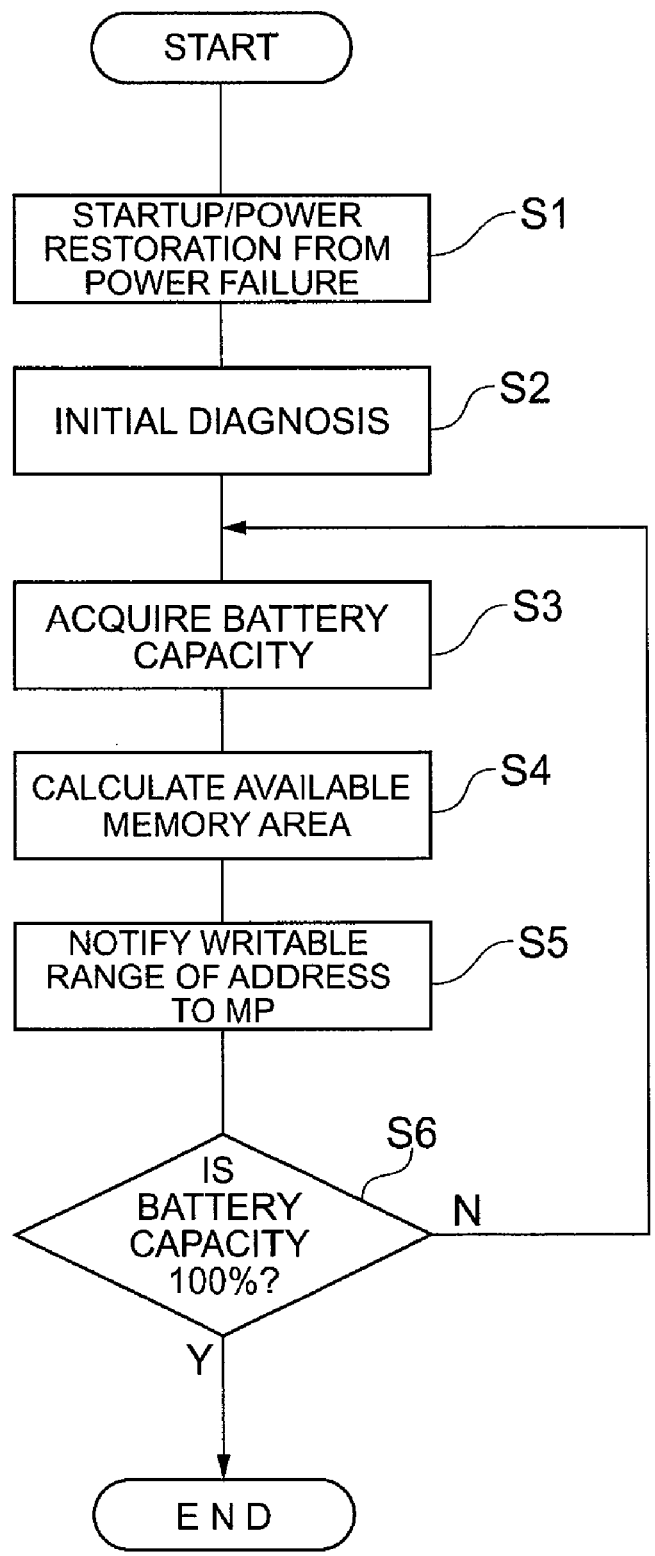
FIG. 11 A flowchart explaining the processing of the memory controller.

The processing of the memory controller 70 is now explained with reference to the flowchart of FIG. 11. Foremost, the memory controller 70 starts the processing at the time of startup or at the time of power restoration from a power failure (S1), and subsequently executes the initial diagnosis processing (S2). The memory controller 70 thereafter acquires the battery capacity of the battery 36 (S3), and calculates the available storage area (also referred to as a memory area) based on the acquired battery capacity (S4).

For example, when the battery capacity is 25%, 25% of the storage area within the storage area of the cache memory 44 is calculated as the available memory area. Similarly, if the battery capacity is 50%, the available memory area is calculated as 50%, if the battery capacity is 75%, the available memory area is calculated as 75%, and if the battery capacity is 100%, the available memory area is calculated as 100%.

Subsequently, the memory controller 70 searches the address management table 76 based on the calculated available memory area, notifies the address range corresponding to the available memory area to the micro processor (MP) 38 (S5), determines whether the battery capacity is 100% (S6), and, if the battery capacity is not 100%, returns to the processing of step S3, and repeats the processing of step S3 to step S5. If the battery capacity is 100%, the memory controller 70 ends the processing in this routine.

As a result of executing the foregoing processing, the memory controller 70 is able to calculate the available memory area according to the battery capacity; that is, it is able to calculate the writable storage area according to the battery capacity, and notify the writable address range to the micro computer (MP) 38 based on the calculation result. The micro processor (MP) 38 is thereby able to decide the data capacity of the data to be written based on the battery capacity of the battery 36 upon writing data into the cache memory (CM) 44.

Figure 12:
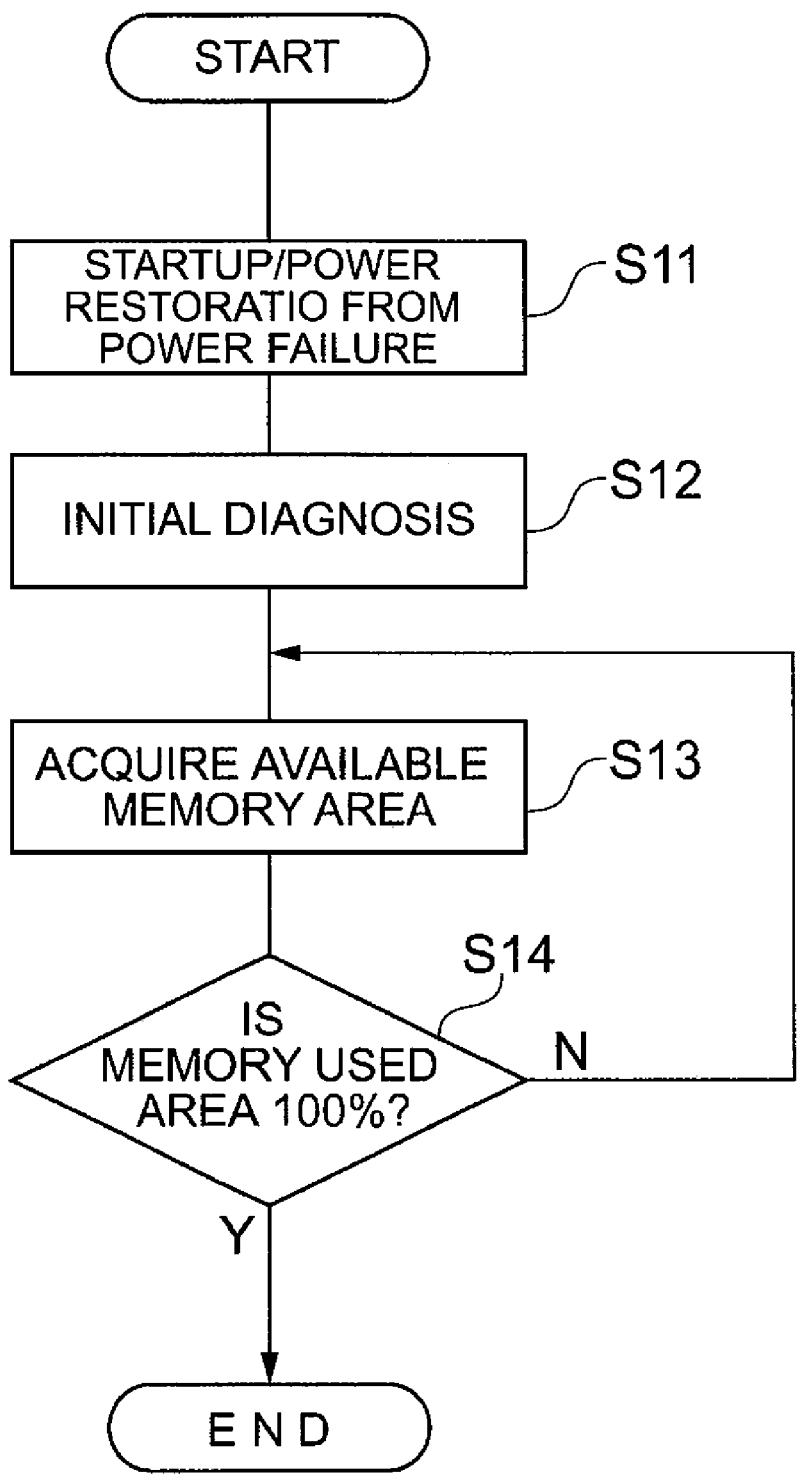
FIG. 12 A flowchart explaining the processing of the micro processor.

The processing of the micro processor 38 is now explained with reference to the flowchart of FIG. 12. The micro processor 38 starts the processing at the time of startup or during the power restoration from a power failure (S11), and foremost performs processing such as initial diagnosis (S12). Subsequently, the micro processor 38 executes processing for acquiring, from the memory controller 70, information concerning the available (writable) memory area (storage area) within the storage area of the cache memory 44 (S13).

Subsequently, the micro processor 38 determines whether the available memory area as the memory area of the cache memory 44 is 100% based on the acquired information (S14). If the available memory area is not 100%, the micro processor 38 returns to the processing of step S13, and repeats the processing from step S13 to step S14. If the micro processor 38 determines that the memory area of the cache memory 44 is 100% available, it ends the processing in this routine.

As described above, at the time of startup or during power restoration, when the memory area of the cache memory 44 sequentially becomes available during the course of the battery capacity of the battery 36 increasing, the micro processor 38 is able to sequentially write data into the memory area that became available, and the micro processor 38 is able to write data in the entire memory area of the cache memory 44 when the battery capacity of the battery 36 becomes a full charge status and the available memory area reaches 100%.

Figure 13:
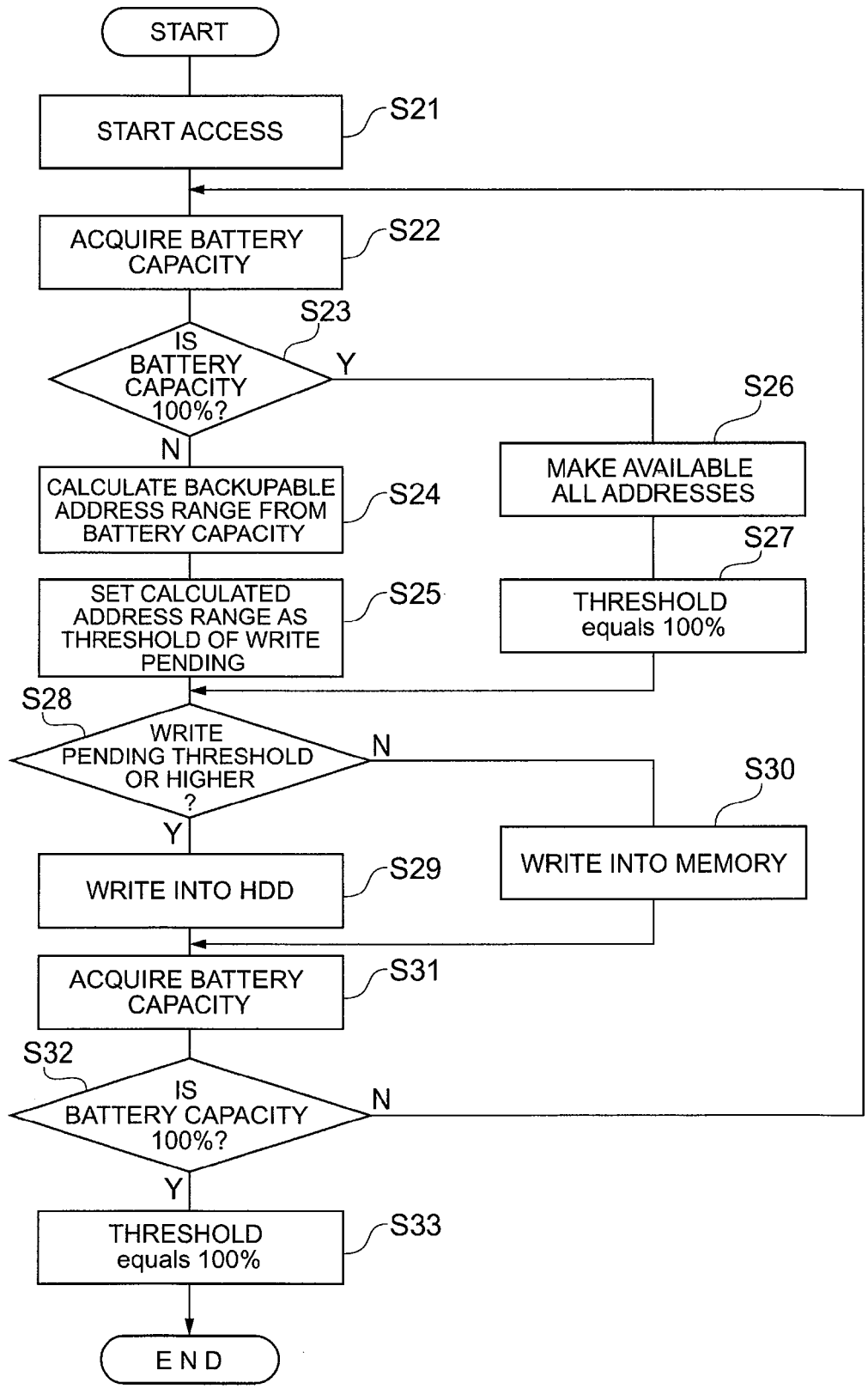
FIG. 13 A flowchart explaining the processing of the micro processor in response to the access from the host computer.

The operation upon processing a command from the host computer as the processing of the micro processor to which the address range in the available cache memory was notified is now explained with reference to the flowchart of FIG. 13.

Foremost, if the micro processor 38 that received a command from any one of the host computers 12 received, for instance, a write access request as the command, it starts the access in response to the write access request (S21), acquires the battery capacity from the memory controller 70 (S22), and determines whether the battery capacity of the battery 36 is 100% (S23).

If the battery capacity of the battery 36 is less than 100%, the micro processor 38 calculates the backupable address range; that is, the writable address range based on the acquired battery capacity (S24).

Here, a backupable address range is the data capacity corresponding to the battery capacity, and the backupable address range equals the battery capacity Wh is greater than or equal to the backup electric power (electric power that is primarily decided from the configuration of the volatile memory 30 and the electric power of the volatile memory 30)/backup time per address.

Subsequently, the micro processor 38 sets the address range calculated according to the battery capacity as the write pending threshold (S25). The write pending threshold is the threshold of the data capacity concerning the data that has not yet been written into the memory device 40, and is the threshold of the data capacity concerning the data that should be left in the cache memory 44.

Meanwhile, at step S23, if the micro processor 38 determines that the battery capacity is 100%, it makes all addresses available (S26), sets the write pending threshold to 100% (S27), and proceeds to the processing of step S28.

At step S28, the micro processor 38 determines whether the data capacity of the write data from the host computer 12 is not less than the write pending threshold. If the micro processor 38 determines that the data capacity of the write data from the host computer 12 is not less than the threshold, it performs processing as the write through processing for writing the write data into the memory device 40 configured from an HDD without writing the write data into the cache memory 44 (S29). Meanwhile, if the micro processor 38 determines that the data capacity of the write data from the host computer 12 is less than the write pending threshold, it writes the write data from the host computer 12 into the cache memory 44 (S30), and proceeds to the processing of step S31.

At step S31, the micro processor 38 acquires the battery capacity of the battery 36 from the memory controller 70 and determines whether the battery capacity is 100% (S32), returns to the processing of step S22 if the battery capacity is less than 100%, and repeats the processing from step S22 to step S32. Meanwhile, if the micro processor 38 determines that the battery capacity is 100%, it sets the write pending threshold to 100% (S33), and ends the processing of this routine.

As described above, the micro processor 38 that was notified of the address range in the available cache memory sets the write pending threshold according to the battery capacity until the battery capacity reaches 100% and sets the write pending threshold to 100% when the battery capacity reaches 100% upon processing the command from the host computer 12, determines whether the data capacity of the write data from the host computer 12 is not less than the write pending threshold, performs processing for writing the write data into the memory device 40 without writing the write data into the cache memory 44 as the write through processing when it determines that the data capacity of the write data from the host computer 12 is not less than the threshold, and writes the write data from the host computer 12 into the cache memory 44 when it determines that the data capacity of the write data from the host computer 12 is less than the write pending threshold.

Figure 14:
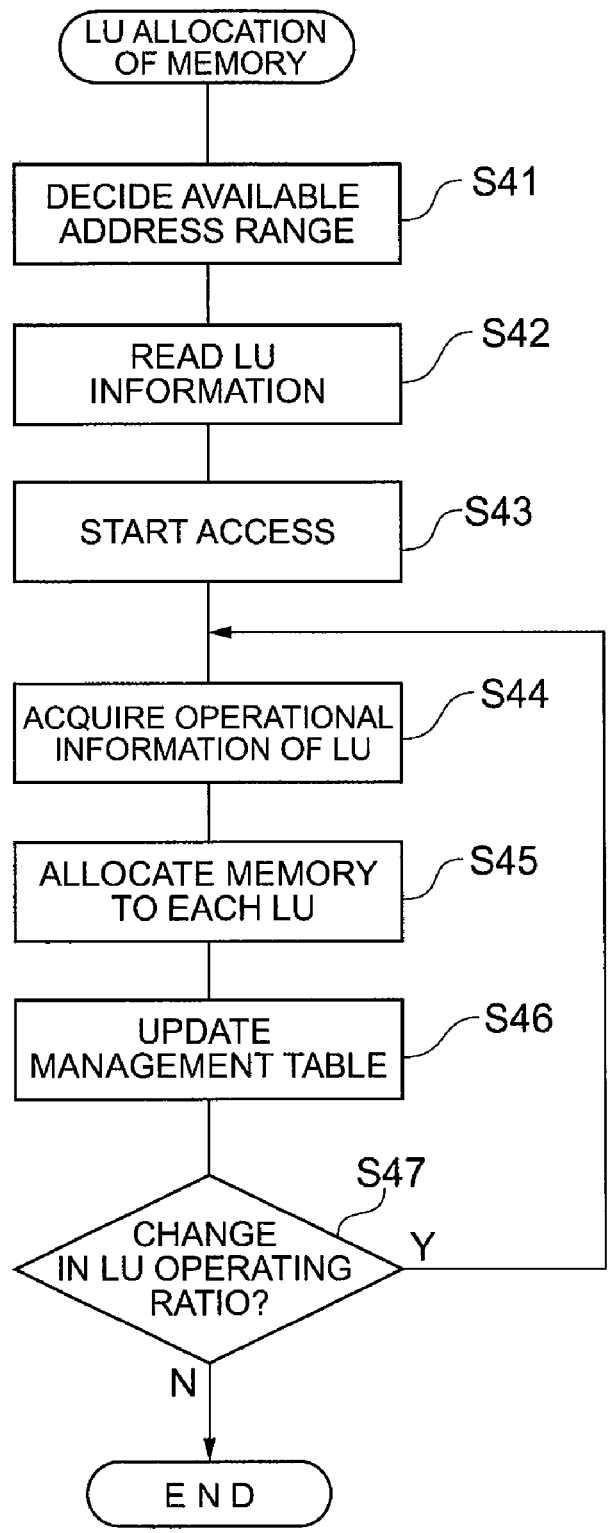
FIG. 14 A flowchart explaining the LU allocation processing of the memory.

The LU allocation processing of the memory is now explained with reference to the flowchart of FIG. 14.

Foremost, the micro processor 38 determines the available address range based on the battery capacity of the battery 36 (S41), reads the LU information concerning each LU (S42), and starts the access based on the read LU information (S43).

The micro processor 38 that started the access acquires the operating ratio information of each LU (S44), allocates a memory; that is, it allocates the cache memory 44 to each LU based on the acquired operating ratio information of each LU (S45), updates the management table 120 of FIG. 16 based on the processing results of allocating the memory to each LU (S46), determines whether the LU operating ratio has changed based on the update result, returns to the processing of step S44 if the LU operating ratio has changed and repeats the processing from step S44 to step S47, and ends the processing of this routine if it determines that the LU operating ratio has not changed.

Figure 15:
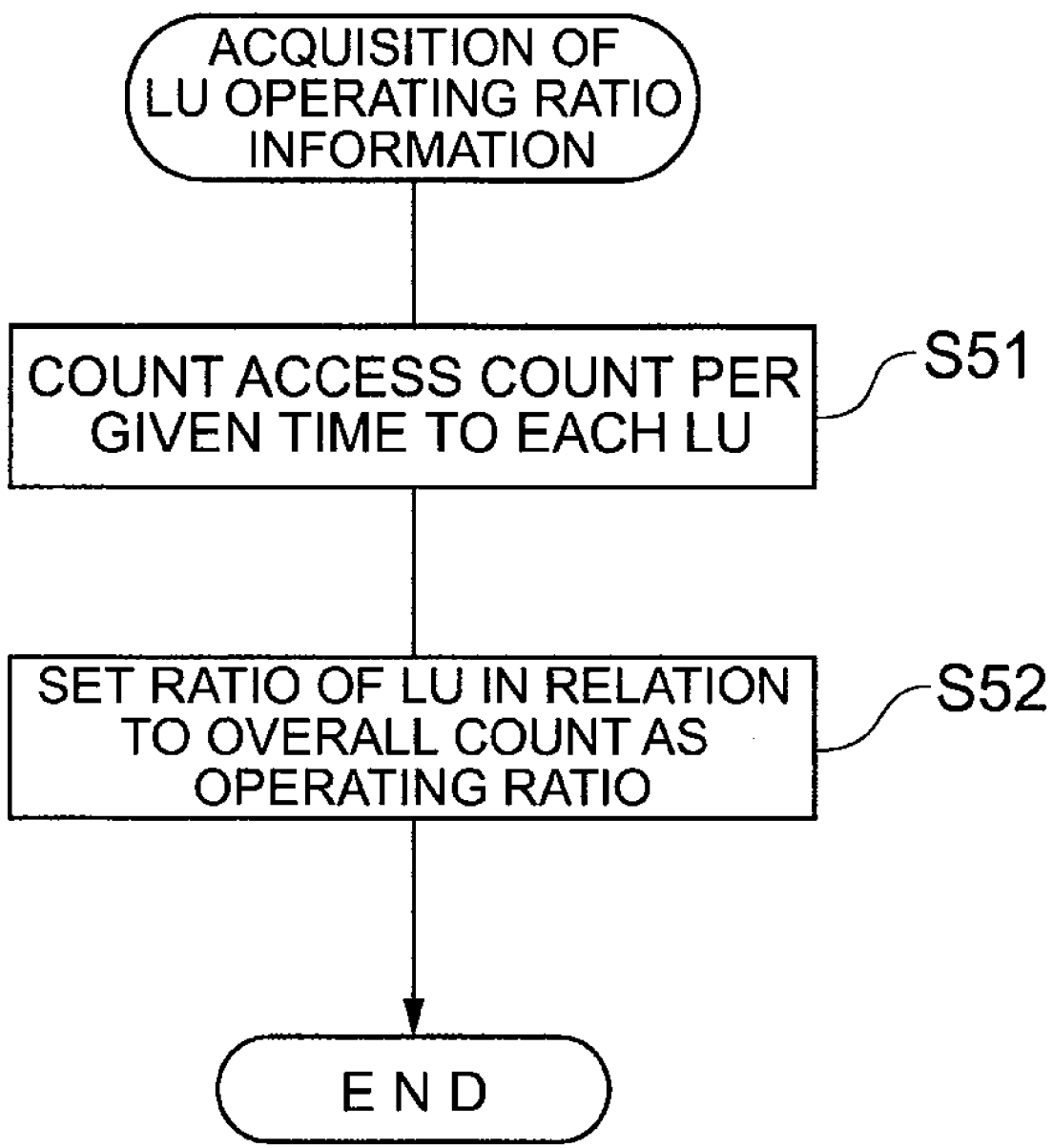
FIG. 15 A flowchart explaining the LU operating ratio information acquisition processing.

Upon performing the LU operating ratio information acquisition processing, as shown in FIG. 15, the micro processor 38 counts the access count per given time to each LU (S51), acquires the operating ratio information of each LU with the ratio of the relevant LU in relation to the overall LU count as the operating ratio (S52), and ends the processing in this routine.

The configuration of the management table 120 is shown in FIG. 16. The management table 120 comprises a total cache size 122, a battery capacity 124, an available cache size 126, a number of available addresses 128, an LU number 130, an operating ratio 132, and an allocation 134.

The total cache size 122 stores the overall capacity of the cache memory 44, the battery capacity 124 stores the battery capacity acquired by the memory controller 70, and the available cache size 126 stores the capacity according to the battery capacity of the battery 36. The number of available addresses 128 stores the number of available addresses that is determined according to the battery capacity. The LU number 130 stores the number of the LU that is allocated to the storage area of the cache memory 44. The operating ratio 132 stores, in %, the operating ratio corresponding to each LU. The allocation 134 stores the number of available addresses according to the operating ratio corresponding to each LU.

As described above, the micro processor 38 acquires the operating ratio information of each LU and allocates the cache memory 44 to each LU based on the acquired operating ratio information of each LU. Specifically, the micro processor 38 divides the storage area of the cache memory 44 based on the operating ratio information of each LU, accesses each of the divided storage areas as the access destination of each LU, and updates the management table 120 based on the result of allocating the cache memory 44 to each LU.

Here, for example, if the number of available addresses is 65536 for the overall cache memory 44, 19661 is allocated as the number of available addresses to the LU of #0 since the operating ratio (operating ratio information) of the LU of #0 is 30%.

According to this example, when the power source 78 is subject to a power failure, the system configuration information and directory information stored in the shared memory 46 are saved to the nonvolatile memory 32 via the switch 72, and data stored in the cache memory 44 is saved to the nonvolatile memory 32 via the switch 72. When the power source 78 is restored after the power failure, since the charging capacity of the battery 34 will become a full charge status before the lapse of the initialization time, the memory controller 70 returns the system configuration information and directory information stored in the nonvolatile memory 32 to the shared memory 46, whereby the system configuration information and directory information can be promptly updated. The micro processor 38 is able to access the information stored in the shared memory 46 on the condition that the initialization time has lapsed, and execute the online processing based on the information stored in the shared memory 46.

Meanwhile, when the power source 78 is restored after the power failure, during the process where the battery capacity of the battery 36 is gradually increasing even after the lapse of the initialization time, as a result of the memory controller 70 performing control so as to cause the storage area of the cache memory 44 to become gradually writable according to the battery capacity of the battery 36, even if the battery 36 is not a full charge status, the micro processor 38 will be able to access the cache memory 44 and gradually write data into the storage area of the cache memory 44 on the condition that the initialization time has lapsed, and the time from power restoration to the time of resumption of business operation can be shortened.

Moreover, during the power restoration of the power source 78, on the condition that the initialization time has lapsed and the charging capacity of the battery 34 has reached the full charge capacity, the memory controller 70 is able to return the information that was saved to the nonvolatile memory 32 to the shared memory 46, and gradually return the data that was saved to the nonvolatile memory 32 to the cache memory 44 according to the charging capacity of the battery 36.

Here, during the power restoration of the power source 78, the memory controller 70 may calculate the available storage area within the storage area of the cache memory 44 according to the charging capacity of the battery 36, and set the data capacity of the data to be returned to the cache memory 44 based on the calculated available storage area.

Although the memory controller 70 was explained as the component for measuring the battery capacity of the battery 36, a configuration may also be adopted where a battery controller for measuring the battery capacity of the battery 36 is provided in substitute for the memory controller 70, the measurement result of the battery controller is transferred to the memory controller 70, and the memory controller 70 calculates the writable storage area in accordance with the battery capacity based on the measurement result of the battery controller.

REFERENCE SIGNS LIST

10 Storage system
12 Host computer
14, 16 Disk control module
18, 20 Disk unit module
22 Network
24 Host interface
26 HDD interface
28 Switch
30 Volatile memory
32 Nonvolatile memory
34, 36 Battery
38 Micro processor
40 Memory device
44 Cache memory
46 Shared memory

The invention claimed is:

1. A disk array device, comprising:
   a first interface unit for sending and receiving information to and from a host computer via a network;
   a memory device for storing data;
   a second interface connected to the memory device and for performing I/O processing of data with the memory device;
   a control unit connected to the first interface unit and the second interface unit and for performing I/O processing of data to a plurality of virtual devices allocated to at least a part of the storage area of the memory device;
   a cache memory for temporarily storing data associated with the processing of the control unit;
   a shared memory for storing information for managing the cache memory;
   a nonvolatile memory for saving data stored in the cache memory and data stored in the shared memory;
   a first battery that is charged by receiving the supply of electric power from a power source that supplies electric power to the control unit, and for feeding power to the cache memory with the charged electric power;
   a second battery that is charged in less time than the first battery by receiving the supply of electric power from the power source, and for feeding power to the shared memory with the charged electric power; and
   a memory controller for saving information stored in the shared memory and data stored in the cache memory to the nonvolatile memory during a power failure of the power source,
   wherein the memory controller monitors the charging capacity of the first battery during the power restoration of the power source, and gradually releases the storage area of the cache memory as an accessible storage area according to the charging capacity of the first battery, and
   wherein, during the power restoration of the power source, the memory controller returns information saved in the nonvolatile memory to the shared memory on the condition that the initialization time has lapsed and the charging capacity of the second battery has reached full charge capacity, and gradually returns data saved in the nonvolatile memory to the cache memory according to the charging capacity of the first battery.

2. The disk array device according to claim 1,
   wherein, during the power restoration of the power source, the memory controller calculates the available storage area within the storage area of the cache memory according to the charging capacity of the first battery, calculates the address range corresponding to the calculated available storage area, and sends the calculated address range to the control unit,
   wherein, during the power restoration of the power source, the control unit accesses the shared memory on the condition that the initialization time has lapsed and the charging capacity of the second battery has reached full charge capacity, and accesses the storage area corresponding to the address range received from the memory controller within the storage area of the cache memory.

3. The disk array device according to claim 1,
wherein, during the power restoration of the power source, the memory controller calculates the available storage area within the storage area of the cache memory according to the charging capacity, and sets the data capacity of data to be returned to the cache memory based on the calculated available storage area.

4. The disk array device according to claim 1,
wherein, during the power restoration of the power source, the control unit accesses the shared memory and the cache memory on the condition that the initialization time has lapsed and the charging capacity of the second battery has reached full charge capacity.

5. The disk array device according to claim 1,
wherein, during the power restoration of the power source, the memory controller calculates the available storage area within the storage area of the cache memory according to the charging capacity of the first battery, calculates the address range corresponding to the calculated available storage area, and sends the calculated address range to the control unit,
wherein, during the power restoration of the power source, the control unit sets a threshold showing the data capacity of data that can be written into the cache memory according to the address range received from the memory controller on the condition that the initialization time has lapsed and the charging capacity of the second battery has reached full charge capacity, and executes processing for writing the write access data into the storage area corresponding to the address range within the storage area of the cache memory if the data capacity of the write access data is less than the threshold, and writing the write access data into the memory device if the data capacity of the write access data is not less than the threshold.

6. The disk array device according to claim 1,
wherein, during the power restoration of the power source, the memory controller calculates the available storage area within the storage area of the cache memory according to the charging capacity of the first battery, calculates the address range corresponding to the calculated available storage area by associating it with a plurality of logical units showing a logical storage area of the memory device, and sends the relationship between the calculated address range and each of the logical units to the control unit,
wherein, during the power restoration of the power source, the control unit calculates a logical unit operating ratio showing a ratio between the access count per given time in relation to each of the logical units and the access count in relation to all of the logical units on the condition that the initialization time has lapsed and the charging capacity of the second battery has reached full charge capacity, divides the storage area corresponding to the address range received from the memory controller within the storage area of the cache memory based on each of the calculated logical unit operating ratios, and accesses the divided storage areas.

7. A method of controlling a disk array device, comprising:
a first interface unit for sending and receiving information to and from a host computer via a network;
a memory device for storing data;
a second interface connected to the memory device and for performing I/O processing of data with the memory device;
a control unit connected to the first interface unit and the second interface unit and for performing I/O processing of data to a plurality of virtual devices allocated to at least a part of the storage area of the memory device;
a cache memory for temporarily storing data associated with the processing of the control unit;
a shared memory for storing information for managing the cache memory;
a nonvolatile memory for saving data stored in the cache memory and data stored in the shared memory;
a first battery that is charged by receiving the supply of electric power from a power source that supplies electric power to the control unit, and for feeding power to the cache memory with the charged electric power;
a second battery that is charged in less time than the first battery by receiving the supply of electric power from the power source, and for feeding power to the shared memory with the charged electric power; and
a memory controller for saving information stored in the shared memory and data stored in the cache memory to the nonvolatile memory during a power failure of the power source,
wherein, during the power restoration of the power source, the memory controller executes:
a step of monitoring the charging capacity of the first battery; and
a step of gradually releasing the storage area of the cache memory as an accessible storage area according to the charging capacity of the first battery based on the monitoring result of the foregoing step, and
wherein, during the power restoration of the power source, the memory controller executes:
a step of returning information saved in the nonvolatile memory to the shared memory on the condition that the initialization time has lapsed and the charging capacity of the second battery has reached full charge capacity, and gradually returning data saved in the nonvolatile memory to the cache memory according to the charging capacity of the first battery.

8. The method of controlling a disk array device according to claim 7,
wherein, during the power restoration of the power source, the memory controller executes:
a step of calculating the available storage area within the storage area of the cache memory according to the charging capacity of the first battery;
a step of calculating the address range corresponding to the available storage area calculated at the foregoing step; and
a step of sending the address range calculated at the foregoing step to the control unit,
wherein, during the power restoration of the power source, the control unit executes:
a step of accessing the shared memory on the condition that the initialization time has lapsed and the charging capacity of the second battery has reached full charge capacity, and accessing the storage area corresponding to the address range received from the memory controller within the storage area of the cache memory.

9. The method of controlling a disk array device according to claim 7,
wherein, during the power restoration of the power source, the memory controller executes:

a step of calculating the available storage area within the storage area of the cache memory according to the charging capacity; and a step of setting the data capacity of data to be returned to the cache memory based on the available storage area calculated at the foregoing step.

10. The method of controlling a disk array device according to claim 7, wherein, during the power restoration of the power source, the control unit executes:

a step of accessing the shared memory and the cache memory on the condition that the initialization time has lapsed and the charging capacity of the second battery has reached full charge capacity.

11. The method of controlling a disk array device according to claim 7, wherein, during the power restoration of the power source, the memory controller executes:

a step of calculating the available storage area within the storage area of the cache memory according to the charging capacity of the first battery;

a step of calculating the address range corresponding to the available storage area calculated at the foregoing step; and a step of sending the address range calculated at the foregoing step to the control unit, wherein, during the power restoration of the power source, the control unit executes:

a step of setting a threshold showing the data capacity of data that can be written into the cache memory according to the address range received from the memory controller on the condition that the initialization time has lapsed and the charging capacity of the second battery has reached full charge capacity;

a step of writing the write access data into the storage area corresponding to the address range within the storage area of the cache memory if the data capacity of the write access data is less than the threshold; and a step of writing the write access data into the memory device if the data capacity of the write access data is not less than the threshold.

12. The method of controlling a disk array device according to claim 7, wherein, during the power restoration of the power source, the memory controller executes:

a step of calculating the available storage area within the storage area of the cache memory according to the charging capacity of the first battery;

a step of calculating the address range corresponding to the available storage area calculated at the foregoing step by associating it with a plurality of logical units showing a logical storage area of the memory device; and a step of sending the relationship between the address range calculated at the foregoing step and each of the logical units to the control unit, wherein, during the power restoration of the power source, the control unit executes:

a step of calculating a logical unit operating ratio showing a ratio between the access count per given time in relation to each of the logical units and the access count in relation to all of the logical units on the condition that the initialization time has lapsed and the charging capacity of the second battery has reached full charge capacity;

a step of dividing the storage area corresponding to the address range received from the memory controller within the storage area of the cache memory based on each of the logical unit operating ratios calculated in the foregoing step; and a step of accessing the storage areas divided in the foregoing step.

* * * * *